(12) United States Patent
Verrilli et al.

(10) Patent No.: US 10,176,090 B2
(45) Date of Patent: Jan. 8, 2019

(54) PROVIDING MEMORY BANDWIDTH COMPRESSION USING ADAPTIVE COMPRESSION IN CENTRAL PROCESSING UNIT (CPU)-BASED SYSTEMS

(71) Applicant: QUALCOMM Incorporated, San Diego, CA (US)

(72) Inventors: Colin Beaton Verrilli, Apex, NC (US); Natarajan Vaidhyanathan, Carrboro, NC (US); Mattheus Cornelis Antonius Adrianus Heddes, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 62 days.

(21) Appl. No.: 15/266,765

(22) Filed: Sep. 15, 2016

(65) Prior Publication Data
US 2018/0074949 A1    Mar. 15, 2018

(51) Int. Cl.
*G06F 12/02*     (2006.01)
*G06F 12/0804*   (2016.01)
(Continued)

(52) U.S. Cl.
CPC ........ *G06F 12/023* (2013.01); *G06F 12/0804* (2013.01); *G06F 12/0866* (2013.01);
(Continued)

(58) Field of Classification Search
CPC ............ G06F 3/00; G06F 3/06–3/0689; G06F 12/00–12/0223; G06F 12/023–12/0292;
(Continued)

(56) References Cited

U.S. PATENT DOCUMENTS 5,376,968 A * 12/1994 Wu ............... H04N 19/503
                                               375/240.14
5,696,927 A    12/1997 MacDonald et al.
(Continued)

FOREIGN PATENT DOCUMENTS

WO        2015142341 A1    9/2015

OTHER PUBLICATIONS

A novel compression algorithm decision method for spark shuffle process; Huang et al.; 2017 IEEE International Conference on Big Data; Dec. 11-14, 2017 (Year: 2017).*
(Continued)

*Primary Examiner* — Daniel C Chappell
(74) *Attorney, Agent, or Firm* — Withrow & Terranova, PLLC

(57) ABSTRACT

Providing memory bandwidth compression using adaptive compression in central processing unit (CPU)-based systems is disclosed. In one aspect, a compressed memory controller (CMC) is configured to implement two compression mechanisms: a first compression mechanism for compressing small amounts of data (e.g., a single memory line), and a second compression mechanism for compressing large amounts of data (e.g., multiple associated memory lines). When performing a memory write operation using write data that includes multiple associated memory lines, the CMC compresses each of the memory lines separately using the first compression mechanism, and also compresses the memory lines together using the second compression mechanism. If the result of the second compression is smaller than the result of the first compression, the CMC stores the second compression result in the system memory. Otherwise, the first compression result is stored.

33 Claims, 10 Drawing Sheets

Page 2

(51) Int. Cl.
*G06F 12/0866* (2016.01)
*G06F 12/0875* (2016.01)
*H04L 29/06* (2006.01)
*H04L 12/811* (2013.01)

(52) U.S. Cl.
CPC .......... *G06F 12/0875* (2013.01); *H04L 47/38* (2013.01); *H04L 69/04* (2013.01); *G06F 2212/1024* (2013.01); *G06F 2212/1044* (2013.01); *G06F 2212/401* (2013.01); *G06F 2212/502* (2013.01); *G06F 2212/608* (2013.01)

(58) Field of Classification Search
CPC ... G06F 12/06–12/0692; G06F 12/08–12/128; G06F 17/30–17/30997; G06F 2212/00–2212/7211; G06F 2213/00–2213/4004; G06F 2216/00–2216/17
See application file for complete search history.

(56) References Cited

U.S. PATENT DOCUMENTS

| | | | |
|---|---|---|---|
| 6,170,047 B1 * | 1/2001 | Dye | G06F 12/08 345/531 |
| 6,523,102 B1 | 2/2003 | Dye et al. | |
| 6,735,673 B2 | 5/2004 | Kever | |
| 6,795,897 B2 | 9/2004 | Benveniste et al. | |
| 6,981,119 B1 | 12/2005 | Lepak et al. | |
| 7,162,583 B2 | 1/2007 | Adl-Tabatabai et al. | |
| 7,302,543 B2 | 11/2007 | Lekatsas et al. | |
| 7,636,810 B2 | 12/2009 | Ramakrishnan | |
| 7,636,813 B2 * | 12/2009 | Tremaine | G06F 13/1673 710/4 |
| 7,844,793 B2 | 11/2010 | Herger et al. | |
| 8,037,251 B2 | 10/2011 | Borkenhagen | |
| 8,175,402 B2 | 5/2012 | Funatsu et al. | |
| 8,176,288 B2 | 5/2012 | Dye | |
| RE43,483 E * | 6/2012 | Geiger | G06F 12/023 711/118 |
| 8,341,380 B2 | 12/2012 | Deming et al. | |
| 8,441,495 B1 | 5/2013 | Van Dyke et al. | |
| 8,510,518 B2 | 8/2013 | O'Connor | |
| 8,539,163 B1 * | 9/2013 | Sivasubramanian | G06F 12/0862 709/202 |
| 8,751,830 B2 * | 6/2014 | Muff | G06F 12/1408 713/189 |
| 8,806,108 B2 | 8/2014 | Suzuki et al. | |
| 9,098,202 B2 | 8/2015 | Yokoi et al. | |
| 9,355,038 B2 | 5/2016 | Patsilaras et al. | |
| 2003/0135694 A1 * | 7/2003 | Naffziger | G06F 12/0802 711/118 |
| 2003/0191903 A1 * | 10/2003 | Sperber | G06F 12/0875 711/144 |
| 2003/0217237 A1 * | 11/2003 | Benveniste | G06F 12/08 711/153 |
| 2004/0030847 A1 * | 2/2004 | Tremaine | G06F 12/023 711/154 |
| 2004/0255209 A1 * | 12/2004 | Gross | G11C 29/4401 714/710 |
| 2005/0071566 A1 | 3/2005 | Adl-Tabatabai et al. | |
| 2005/0114601 A1 * | 5/2005 | Ramakrishnan | G06F 12/0802 711/118 |
| 2005/0144388 A1 * | 6/2005 | Newburn | G06F 12/0802 711/118 |
| 2005/0160234 A1 * | 7/2005 | Newburn | G06F 12/0802 711/144 |
| 2006/0139188 A1 * | 6/2006 | Sasakura | H03M 7/3084 341/51 |
| 2011/0066808 A1 | 3/2011 | Flynn et al. | |
| 2013/0179752 A1 | 7/2013 | Shim et al. | |
| 2014/0092678 A1 | 4/2014 | Feekes | |
| 2014/0095561 A1 | 4/2014 | Wegener | |
| 2014/0208003 A1 | 7/2014 | Cohen et al. | |
| 2014/0244962 A1 * | 8/2014 | Arges | G06F 12/023 711/171 |
| 2015/0304441 A1 | 10/2015 | Ichien | |
| 2015/0339228 A1 | 11/2015 | Heddes et al. | |
| 2015/0339237 A1 | 11/2015 | Heddes et al. | |
| 2015/0339239 A1 | 11/2015 | Heddes et al. | |
| 2016/0055088 A1 * | 2/2016 | Zhang | G06F 12/0862 711/137 |
| 2017/0068621 A1 | 3/2017 | Watanabe et al. | |
| 2017/0286308 A1 | 10/2017 | Verrilli et al. | |
| 2018/0018268 A1 | 1/2018 | Verrilli et al. | |

OTHER PUBLICATIONS

Efficient Data Communication Using Dynamic Switching of Compression Method; Omote et al.; First International Symposium on Computing and Networking; Dec. 4-6, 2013 (Year: 2013).*
Author Unknown, "Understanding Memory Resource Management in VMware ESX 4.1," Vmware, Inc., 2010, retrieved from http://www.vmware.com/files/pdf/techpaper/vsp_41_perf_memory_mgmt.pdf, 25 pages.
Pekhimenko, G. et al., "Linearly Compressed Pages: A Low-Complexity,Low-Latency Main Memory Compression Framework," Proceedings of the 46th Annual IEEE/ACM International Symposium on Microarchitecture (MICRO-46), Dec. 7-11, 2013, Davis, CA, ACM, 13 pages.
International Search Report and Written Opinion for PCT/US2017/047532, dated Oct. 20, 2017, 14 pages.
Chen, Long et al., "Free ECC: An Efficient Error Protection for Compressed Last-Level Caches," 2013 IEEE 31st International Conference on Computer Design (ICCD), Oct. 1, 2013, pp. 278-285.
International Search Report and Written Opinion for PCT/US2017/022060, dated May 30, 2017, 20 pages.
Second Written Opinion for PCT/US2017/047532, dated Aug. 3, 2018, 7 pages.

* cited by examiner

PROVIDING MEMORY BANDWIDTH COMPRESSION USING ADAPTIVE COMPRESSION IN CENTRAL PROCESSING UNIT (CPU)-BASED SYSTEMS

BACKGROUND

I. Field of the Disclosure

The technology of the disclosure relates generally to computer memory systems, and, in particular, to memory controllers in computer memory systems for providing central processing units (CPUs) with a memory access interface to memory.

II. Background

Microprocessors perform computational tasks for a wide variety of applications. A typical microprocessor application includes one or more central processing units (CPUs) that execute software instructions. The software instructions may instruct a CPU to fetch data from a location in memory, perform one or more CPU operations using the fetched data, and generate a result. The result may then be stored in memory. As non-limiting examples, this memory can be a cache local to the CPU, a shared local cache among CPUs in a CPU block, a shared cache among multiple CPU blocks, or main memory of the microprocessor.

In this regard, FIG. 1 is a schematic diagram of an exemplary system-on-a-chip (SoC) 100 that includes a CPU-based system 102. The CPU-based system 102 includes a plurality of CPU blocks 104(0)-104(N) in this example, wherein 'N' is equal to any number of CPU blocks 104(0)-104(N) desired. In the example of FIG. 1, each of the CPU blocks 104(0)-104(N) contains two (2) CPUs 106(0), 106(1). The CPU blocks 104(0)-104(N) further contain shared Level 2 (L2) caches 108(0)-108(N), respectively. A system cache 110 (e.g., a Level 3 (L3) cache) is also provided for storing cached data that is used by any of, or shared among, each of the CPU blocks 104(0)-104(N). An internal system bus 112 is provided to enable each of the CPU blocks 104(0)-104(N) to access the system cache 110 as well as other shared resources. Other shared resources accessed by the CPU blocks 104(0)-104(N) through the internal system bus 112 may include a memory controller 114 for accessing a main, external memory (e.g., double-rate dynamic random access memory (DRAM) (DDR), as a non-limiting example), peripherals 116, other storage 118, an express peripheral component interconnect (PCI) (PCI-e) interface 120, and/or a direct memory access (DMA) controller 122.

As CPU-based applications executing in the CPU-based system 102 in FIG. 1 increase in complexity and performance, limitations on memory bandwidth may impose a constraint on the CPU-based system 102. If accesses to external memory reach memory bandwidth limits, the memory controller 114 of the CPU-based system 102 may be forced to queue memory access requests. Such queueing of memory access requests may increase the latency of memory accesses, which in turn may decrease the performance of the CPU-based system 102.

Memory bandwidth savings may be realized by employing memory bandwidth compression schemes to potentially reduce the bandwidth consumed by a given memory access. Conventional memory bandwidth compression schemes are directed to compressing an amount of data corresponding to a memory line size of the CPU-based system 102. While increasing the memory line size of the CPU-based system 102 may result in higher data compression ratios in some circumstances, an increased memory line size may also cause an increase in wasted memory bandwidth. Accordingly, it is desirable to provide a memory bandwidth compression scheme that enables higher compression ratios while also reducing memory bandwidth consumption.

SUMMARY OF THE DISCLOSURE

Aspects disclosed herein include providing memory bandwidth compression using adaptive compression in central processing unit (CPU)-based systems. In one aspect, a memory bandwidth compression system is provided by a central processing unit (CPU)-based system. The memory bandwidth compression system includes a compressed memory controller (CMC) and a system cache that are configured to cooperate to provide an adaptive compression scheme. Using the adaptive compression scheme, a system memory of the CPU-based system is organized into groups of associated memory lines (e.g., pairs of adjacent memory lines, in some instances). The CMC is configured to implement two (2) compression mechanisms: a first compression mechanism that is suitable for compressing relatively small amounts of data (e.g., a single memory line), and a second compression mechanism suited for compressing relatively large amounts of data (e.g., a group of associated memory lines). When performing a memory write operation using write data sent by the system cache, the CMC may determine whether the write data includes a single memory line or a plurality of associated memory lines. In the latter case, the CMC performs adaptive compression by compressing separately each of the plurality of associated memory lines using the first compression mechanism to generate a first compression result, and also compressing together the plurality of memory lines using the second compression mechanism to generate a second compression result. If a size of the second compression result is smaller than a size of the first compression result, the CMC stores the second compression result in the system memory. Otherwise, the first compression result is stored in the system memory. The CMC in some aspects uses a master table stored in the system memory to track how compressed data is stored in the system memory (e.g., a compressed length of each memory line, a compression type used for each memory line, and an indication of which memory granules within a compressed data area are occupied for the memory line, as non-limiting examples). In some aspects, the system cache is configured to provide a prefetch accuracy indicator that may be provided to and used by the CMC to determine whether to read compressed data for a single memory line or multiple memory lines from the system memory.

In another aspect, a memory bandwidth compression system of a CPU-based system is provided. The memory bandwidth compression system includes a CMC configured to access a system memory and communicatively coupled to a system cache via a system bus. The CMC is further configured to receive, from the system cache, a memory write request comprising a memory write address and write data. The CMC is also configured to compress separately each memory line of a plurality of associated memory lines of the write data using a first compression mechanism to generate a first compression result. The CMC is further configured to compress together the plurality of associated memory lines using a second compression mechanism to generate a second compression result. The CMC is also configured to determine whether a size of the second compression result is smaller than a size of the first compression result. The CMC is additionally configured to, responsive to determining that a size of the second compression result is smaller than a size of the first compression result, write the second compression result to a compressed data area corresponding to the memory write address in the system memory. The CMC is further configured to, responsive to determining that a size of the second compression result is not smaller than a size of the first compression result, write the first compression result to the compressed data area corresponding to the memory write address in the system memory.

In another aspect, a memory bandwidth compression system of a CPU-based system is provided. The memory bandwidth compression system includes a means for receiving a memory write request comprising a memory write address and write data. The memory bandwidth compression system also includes a means for compressing separately each memory line of a plurality of associated memory lines of the write data using a first compression mechanism to generate a first compression result. The memory bandwidth compression system additionally includes a means for compressing together the plurality of associated memory lines using a second compression mechanism to generate a second compression result. The memory bandwidth compression system further includes a means for determining whether a size of the second compression result is smaller than a size of the first compression result. The memory bandwidth compression system also includes a means for writing the second compression result to a compressed data area corresponding to the memory write address in a system memory, responsive to determining that a size of the second compression result is smaller than a size of the first compression result. The memory bandwidth compression system additionally includes a means for writing the first compression result to the compressed data area corresponding to the memory write address in the system memory, responsive to determining that a size of the second compression result is not smaller than a size of the first compression result.

In another aspect, a method for providing adaptive memory bandwidth compression is provided. The method includes receiving, by a CMC from a system cache, a memory write request comprising a memory write address and write data. The method also includes compressing separately each memory line of a plurality of associated memory lines of the write data using a first compression mechanism to generate a first compression result. The method additionally includes compressing together the plurality of associated memory lines using a second compression mechanism to generate a second compression result. The method further includes determining whether a size of the second compression result is smaller than a size of the first compression result. The method also includes, responsive to determining that a size of the second compression result is smaller than a size of the first compression result, writing the second compression result to a compressed data area corresponding to the memory write address in a system memory. The method additionally includes, responsive to determining that a size of the second compression result is not smaller than a size of the first compression result, writing the first compression result to the compressed data area corresponding to the memory write address in the system memory.

DETAILED DESCRIPTION

Figure 1:
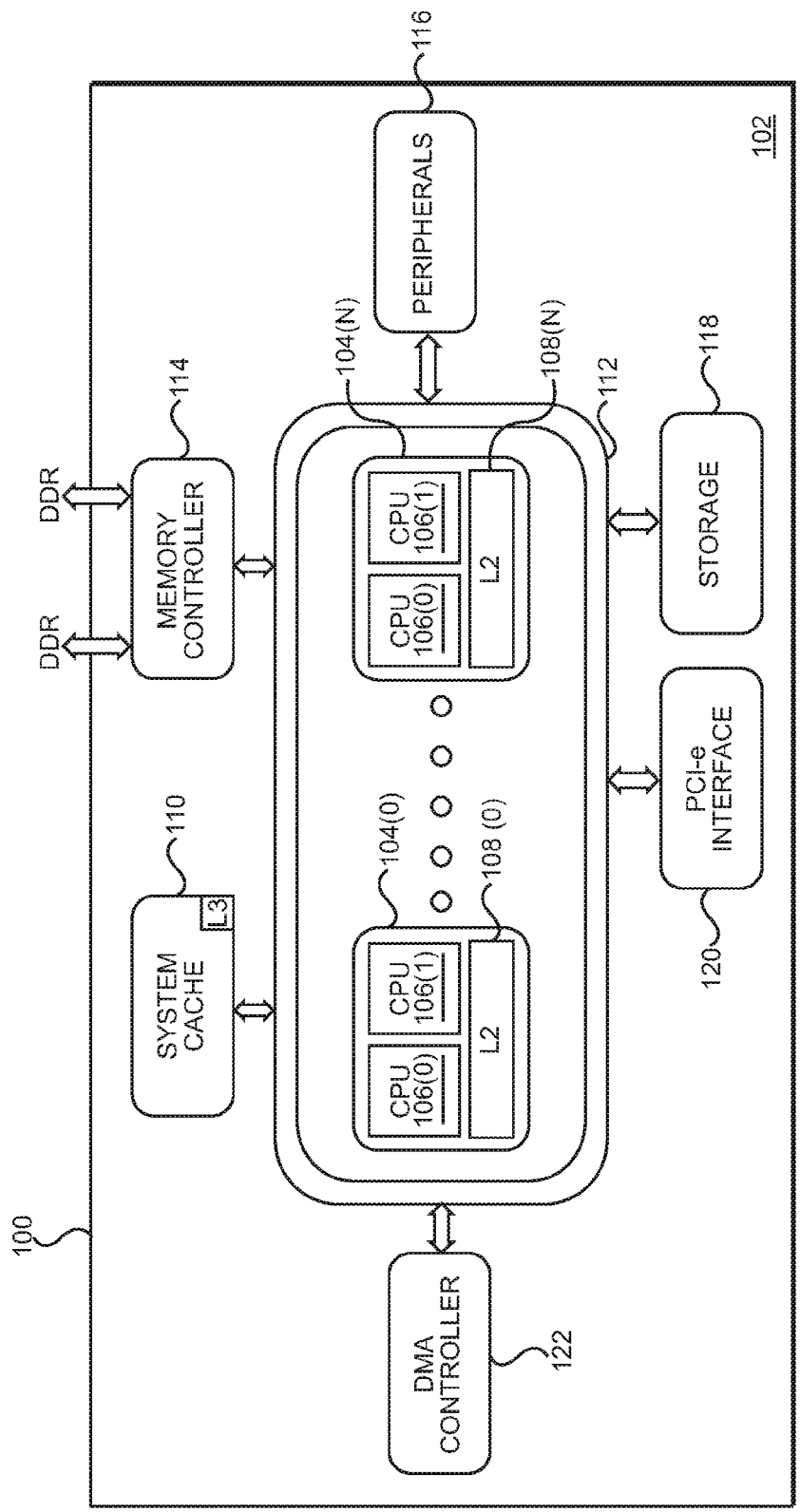
FIG. 1 is a schematic diagram of an exemplary system-on-a-chip (SoC) that includes a central processing unit (CPU)-based system.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed herein include providing memory bandwidth compression using adaptive compression in central processing unit (CPU)-based systems. In some aspects, a compressed memory controller (CMC) is configured to provide adaptive memory bandwidth compression by decompressing memory read requests and/or compressing memory write requests. As used herein, "adaptive compression" refers to compressing and decompressing multiple memory lines either separately using a first compression mechanism or together using a second compression mechanism, depending on which approach provides a greater compression ratio and/or depending on a determined effectiveness of prefetching associated memory lines.

Figure 2:
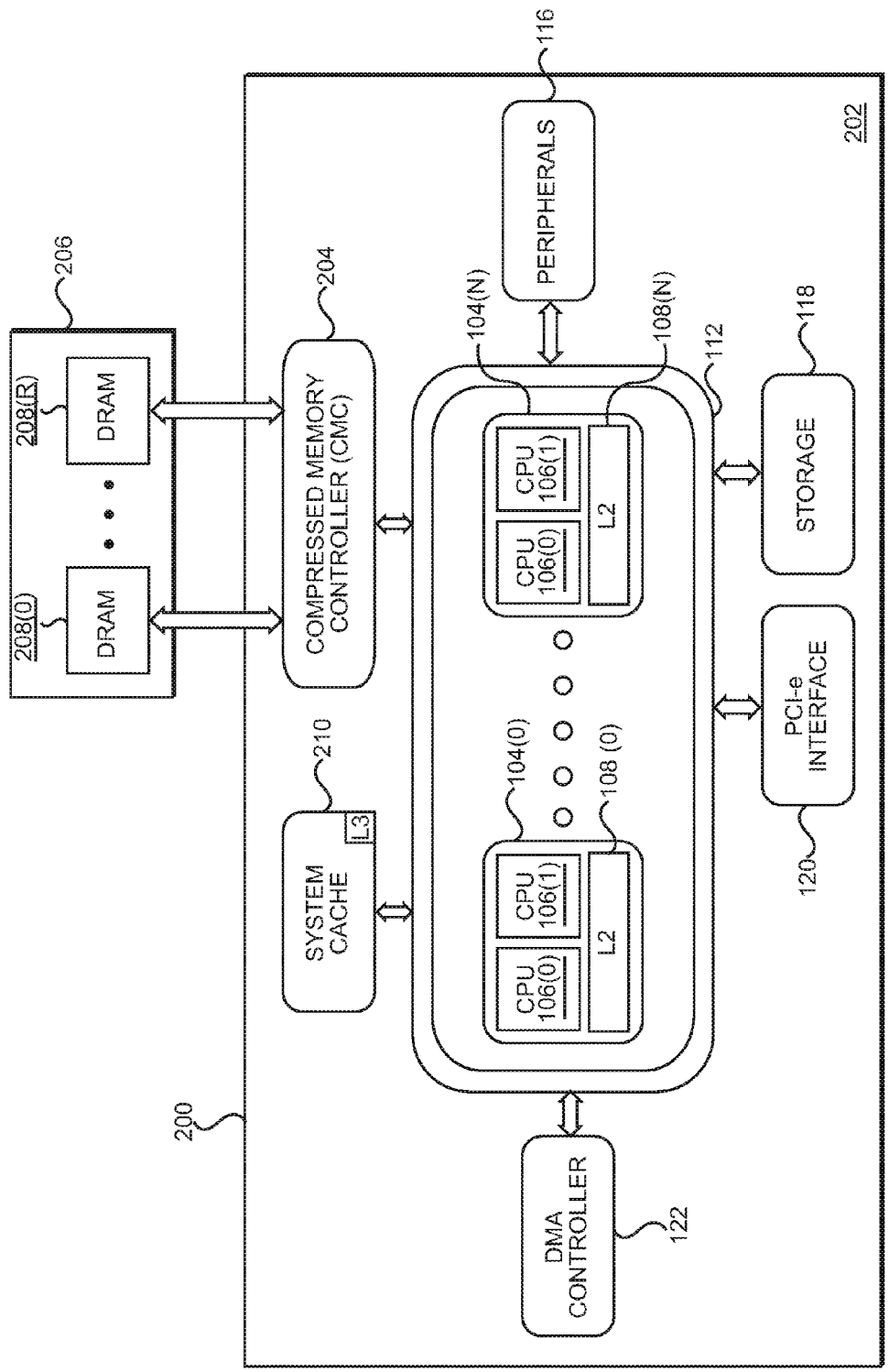
FIG. 2 is a schematic diagram of an SoC that includes an exemplary CPU-based system having a plurality of CPUs and a compressed memory controller (CMC) configured to provide memory bandwidth compression.

In this regard, FIG. 2 is a schematic diagram of a system-on-a-chip (SoC) 200 that includes a CPU-based system 202 having a plurality of CPU blocks 104(0)-104(N) similar to the CPU-based system 102 in FIG. 1. The CPU-based system 202 in FIG. 2 includes some common components with the CPU-based system 102 in FIG. 1, which are noted by common element numbers between FIGS. 1 and 2. For the sake of brevity, these elements will not be re-described. However, in the CPU-based system 202 in FIG. 2, a CMC 204 is provided. The CMC 204 controls access to a system memory 206. The system memory 206 may comprise one or more double data rate (DDR) dynamic random access memories (DRAMs) 208(0)-208(R) (referred to hereinafter as "DRAM 208(0)-208(R)"), as a non-limiting example. The CMC 204 in this example employs memory bandwidth compression according to the aspects disclosed herein and below. Similar to the memory controller 114 of the CPU-based system 102 of FIG. 1, the CMC 204 in the CPU-based system 202 in FIG. 2 is shared by the CPU blocks 104(0)-104(N) through the internal system bus 112. A system cache 210, having functionality corresponding to the system cache 110 of FIG. 1, is configured to coordinate with the CMC 204 to provide adaptive memory bandwidth compression, as described below in greater detail with respect to FIGS. 4 and 5. It is to be understood that "adaptive memory bandwidth compression," as used herein, refers generally to operations carried out by the CMC 204 and the system cache 210 for both compressing data to be written to the system memory 206 as well as decompressing data read from the system memory 206.

Figure 3:
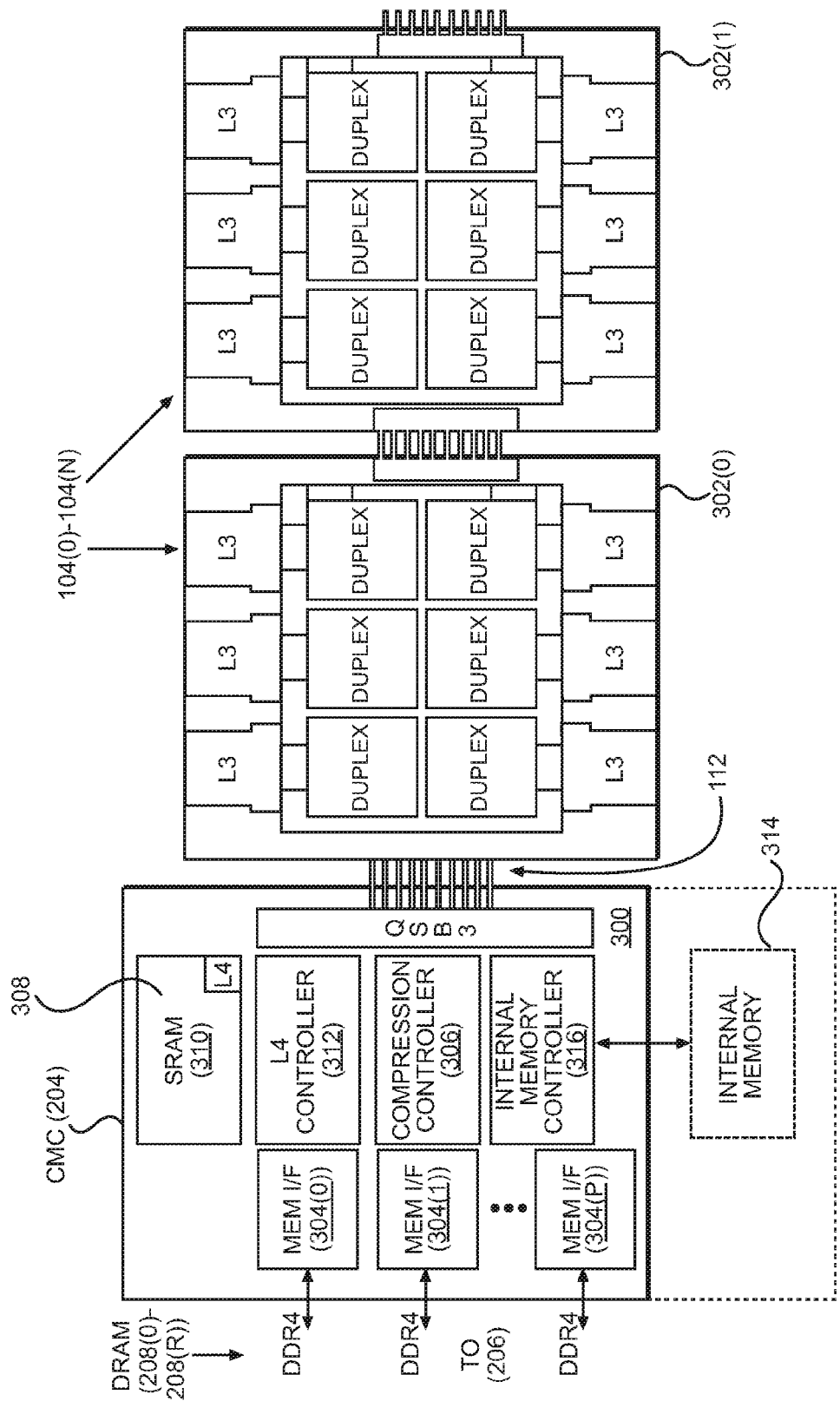
FIG. 3 is a more detailed schematic diagram of the CMC of FIG. 2, wherein the CMC is further communicatively coupled to an optional, internal memory that may be employed to provide memory bandwidth compression.

To illustrate a more detailed schematic diagram of exemplary internal components of the CMC 204 in FIG. 2, FIG. 3 is provided. In the example of FIG. 3, the CMC 204 is provided on a separate semiconductor die 300 from semiconductor dies 302(0), 302(1) that contain the CPU blocks 104(0)-104(N) in FIG. 2. Alternatively, in some aspects the CMC 204 may be included in a common semiconductor die with the CPU blocks 104(0)-104(N). Regardless of the die configurations, the CMC 204 is provided such that the CPU blocks 104(0)-104(N) may make memory access requests via the internal system bus 112 to the CMC 204, and receive data from memory through the CMC 204.

With continuing reference to FIG. 3, the CMC 204 controls operations for memory accesses to the system memory 206, which is shown in FIGS. 2 and 3 as comprising DRAM 208(0)-208(R). The CMC 204 includes a plurality of memory interfaces (MEM I/Fs) 304(0)-304(P) (e.g., DDR DRAM interfaces) used to service memory access requests. In this regard, the CMC 204 in this example includes a compression controller 306. The compression controller 306 controls the compression of data stored to the system memory 206 and the decompression of data retrieved from the system memory 206 in response to memory access requests from the CPU blocks 104(0)-104(N). The compression controller 306 can also be configured to perform bandwidth compression of information provided over the internal system bus 112 to the CPU blocks 104(0)-104(N).

As will be discussed in more detail below, the compression controller 306 can perform any number of compression techniques and algorithms to provide memory bandwidth compression. A local memory 308 is provided for data structures and other information needed by the compression controller 306 to perform such compression techniques and algorithms. In this regard, the local memory 308 is provided in the form of a static random access memory (SRAM) 310. The local memory 308 is of sufficient size to be used for data structures and other data storage that may be needed for the compression controller 306 to perform compression techniques and algorithms. The local memory 308 may also be partitioned to contain a cache, such as a Level 4 (L4) cache, to provide additional cache memory for internal use within the CMC 204. Thus, an L4 controller 312 may also be provided in the CMC 204 to provide access to the L4 cache. Enhanced compression techniques and algorithms may require a larger internal memory. For example, the local memory 308 may provide 128 kilobytes (kB) of memory.

Further, as shown in FIG. 3, an optional, additional internal memory 314 can also be provided for the CMC 204. The additional internal memory 314 may be provided as DRAM, as an example. The additional internal memory 314 can facilitate additional or greater amounts of storage of data structures and other data than in the local memory 308 for the CMC 204 providing memory bandwidth compression and decompression mechanisms to increase the memory bandwidth compression of the CPU-based system 202. An internal memory controller 316 is provided in the CMC 204 to control memory accesses to the additional internal memory 314 for use in compression As noted above, the CMC 204 in FIG. 3 may perform memory bandwidth compression, including, in some aspects, zero-line compression. The local memory 308 can be used to store larger data structures used for such compression. As discussed in greater detail below, memory bandwidth compression may reduce memory access latency and allow more CPUs 106(0), 106(1) or their respective threads to access a same number of memory communications channels while minimizing the impact to memory access latency. In some aspects, the number of memory communications channels may be reduced while achieving similar latency results compared to a greater number of memory communications channels if such compression was not performed by the CMC 204, which may result in reduced system level power consumption.

Each of the resources provided for memory bandwidth compression in the CMC 204 in FIG. 3, including the local memory 308 and the additional internal memory 314, can be used individually or in conjunction to achieve the desired balance among resources and area, power consumption, and increased performance through memory bandwidth compression. Memory bandwidth compression can be enabled or disabled, as desired. Further, the resources described above for use by the CMC 204 can be enabled or disabled to achieve the desired tradeoffs among memory bandwidth compression efficiency, power consumption, and performance. Exemplary memory bandwidth compression techniques using these resources available to the CMC 204 will now be discussed.

Figure 4:
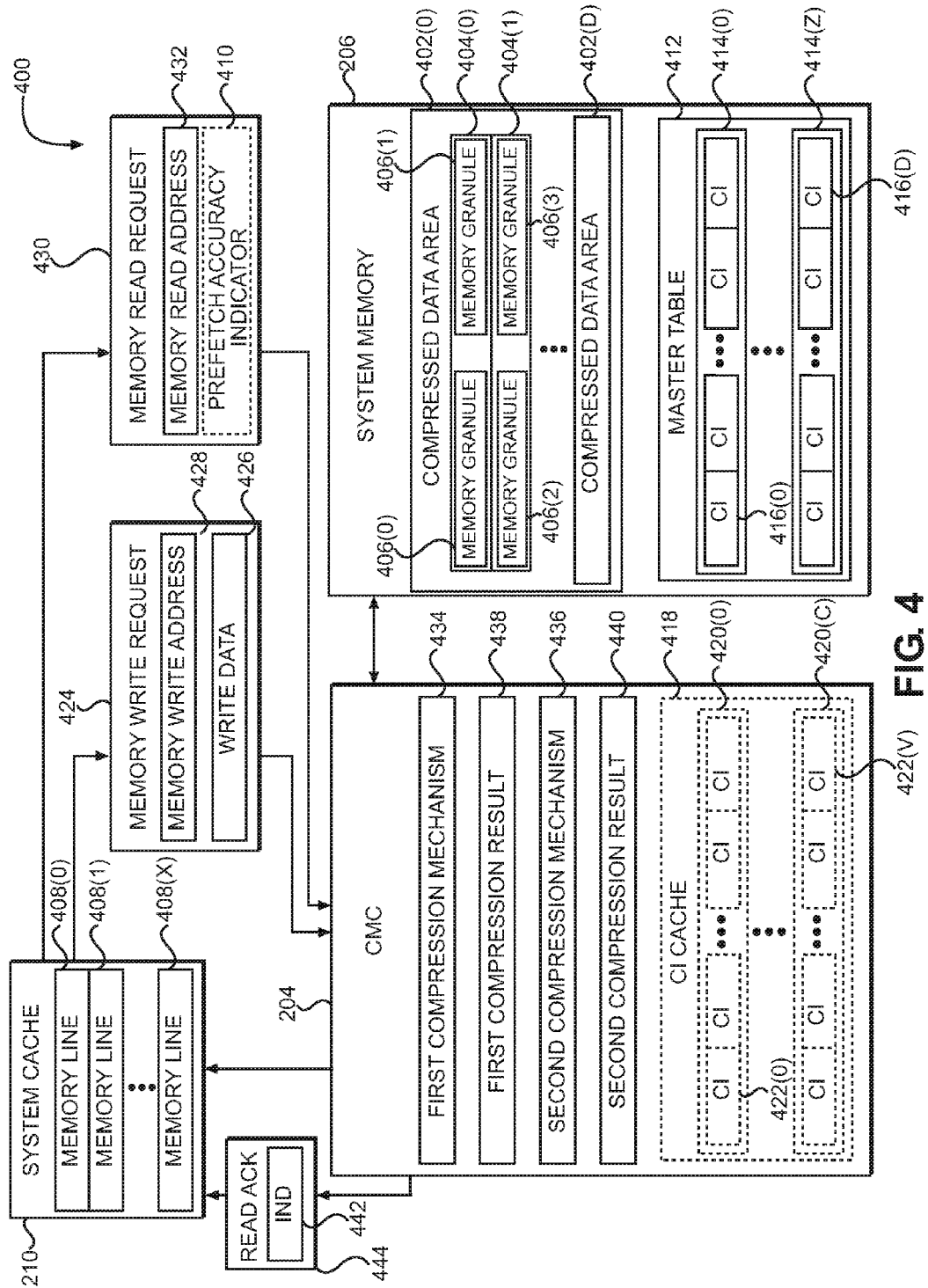
FIG. 4 is a diagram illustrating an exemplary memory bandwidth compression system that may be implemented by the CMC and the system cache of FIGS. 2 and 3 for providing adaptive memory bandwidth compression.

In this regard, FIG. 4 illustrates an exemplary memory bandwidth compression mechanism 400 that can be implemented by the CMC 204 of FIGS. 2 and 3 to provide memory bandwidth compression. In the memory bandwidth compression mechanism 400, the system memory 206 provides a plurality of compressed data areas 402(0)-402(D) for storing compressed data. In this example, each of the compressed data areas 402(0)-402(D) includes a pair of adjacent memory lines, such as memory lines 404(0) and 404(1) of the compressed data area 402(0). Although not shown in FIG. 4, it is to be understood that the compressed data area 402(D) also includes a pair of adjacent memory lines. It is to be further understood that, while FIG. 4 illustrates two memory lines 404(0), 404(1) within the compressed data area 402(0), each of the compressed data areas 402(0)-402(D) may include more memory lines than shown herein.

Each of the memory lines 404(0), 404(1) is made up of memory granules 406(0), 406(1) and 406(2), 406(3), respectively. The size of each of the memory granules 406(0)-406(3) represents the memory read/write granularity of the system memory 206 (i.e., a smallest amount of data that may be read from the system memory 206 in a memory read operation or written to the system memory 206 in a memory write operation). For example, in some exemplary memory architectures in which each of the memory lines 404(0), 404(1) is 128 bytes in size, each of the memory granules 406(0)-406(3) may provide 64 bytes of data. Compressed data corresponding to memory addresses associated with the memory lines 404(0), 404(1) may be stored within the memory granules 406(0)-406(3) of the compressed data area 402(0). Some aspects may provide that each of the memory granules 406(0)-406(3) may comprise more or fewer bytes of data (e.g., 256 bytes or 64 bytes, as non-limiting examples). In some aspects, a memory read operation may read fewer bytes than the size of a memory granule 406(0)-

406(3), but still consume the same amount of memory bandwidth as one of the memory granules 406(0)-406(3).

The memory bandwidth compression mechanism 400 further provides the system cache 210 configured to cache a plurality of memory lines 408(0)-408(X), each of which is the same size as the memory lines 404(0), 404(1) of the system memory 206. As discussed in greater detail below, the system cache 210 is configured to coordinate with the CMC 204 to provide adaptive compression. In particular, in some aspects, the system cache 210 is configured to receive data for one or more memory lines 408(0)-408(X) from the CMC 204 as a single request, and may be configured to associate adjacent memory lines, such as the memory lines 408(0), 408(1), when storing and/or evicting the memory lines 408(0), 408(1). For instance, the system cache 210 may be configured to store the associated memory lines 408(0), 408(1) within the same set, and may preferentially evict both of the associated memory lines 408(0), 408(1) together, even if one does not contain dirty data. The system cache 210 may also be configured to evict a selected one of the associated memory lines 408(0), 408(1), but write back the other associated memory line 408(0), 408(1). The system cache 210 may also be configured to accept multiple memory lines (e.g., "prefetched" memory lines) from the CMC 204.

Additionally, some aspects of the system cache 210 may be configured to maintain data regarding prefetch accuracy, and to provide such data to the CMC 204. For example, the system cache 210 may maintain a bit or other indicator (not shown) for each of the memory lines 408(0)-408(X) indicating whether the memory line 408(0)-408(X) was prefetched (i.e., not specifically requested from the CMC 204, but received from the CMC 204 along with a requested memory line 408(0)-408(X)). The system cache 210 may also maintain a count of prefetched memory lines 408(0)-408(X) received from the CMC 204 that were subsequently accessed (i.e., read or written), along with a count of total prefetched memory lines 408(0)-408(X) from the CMC 204. Based on this data, some aspects of the system cache 210 may generate a prefetch accuracy indicator 410 as a ratio of the count of prefetched lines received that were subsequently accessed and the count of total prefetched lines received, and may provide the prefetch accuracy indicator 410 to the CMC 204. In some aspects, the prefetch accuracy indicator 410 may include a binary value indicating whether the ratio of the count of prefetched lines received that were subsequently accessed and the count of total prefetched lines received exceeds a specified threshold. The CMC 204 may use the prefetch accuracy indicator 410 when determining how much compressed data to read from the system memory 206 during a memory read operation.

The system memory 206 also includes a master table 412, which includes multiple master table entries 414(0)-414(Z). The master table entries 414(0)-414(Z) store compression indicators (CIs) 416(0)-416(D), each of which provides information regarding the compression status of a corresponding compressed data area 402(0)-402(D) of the system memory 206. As non-limiting examples, each of the CIs 416(0)-416(D) may encode a compressed length, a compression type, and/or an occupied memory granules indicator for the corresponding compressed data area 402(0)-402(D). In some aspects, the CIs 416(0)-416(D) have a size of six (6) to eight (8) bits, with each possible bit combination representing one potential combination of compressed length, compression type, and occupied memory granules 406(0)-406(3). In some aspects, the CMC 204 may further include a CI cache 418 providing a plurality of CI cache entries 420(0)-420(C) for caching CIs 422(0)-422(V) that were previously read from the master table 412. Using the CI cache 418, the CMC 204 may reduce memory access latency that may be incurred by reading the master table 412 in the system memory 206.

To provide adaptive memory bandwidth compression, the CMC 204 may receive requests for memory write operations (such as a memory write request 424 to store write data 426 to a memory write address 428) and memory read operations (such as a memory read request 430 from a memory read address 432) from the system cache 210. The CMC 204 is configured to provide a first compression mechanism 434 and a second compression mechanism 436 for performing compression of data. In some aspects, the first compression mechanism 434 may include a compression algorithm that is suitable for compressing relatively small amounts of data (e.g., a single 128-byte memory line 408(0)-408(X)), while the second compression mechanism 436 may include a compression algorithm that is suitable for compressing relatively large amounts of data (such as 256 bytes of data provided by a pair of associated memory lines 408(0), 408(1)).

When performing memory write operations (e.g., in response to an eviction of one or more memory lines 408(0)-408(X), the CMC 204 may first determine whether the write data 426 received from the system cache 210 includes just a single memory line (e.g., the memory line 408(0)), or whether the write data 426 includes a plurality of associated memory lines (such as the pair of memory lines 408(0), 408(1)). According to some aspects, this determination may be made based on how many memory lines 408(0)-408(X) are written back by the system cache 210 to the system memory 206. Some aspects may provide that the system cache 210 may provide a dirty bit or other indicator (not shown) for each of the memory lines 408(0)-408(X) in the write data 426. In such aspects, even if the write data 426 includes multiple memory lines 408(0)-408(X), the CMC 204 may still determine that only a single memory line 408(0)-408(X) should be written to the system memory 206, based on the dirty bits for the memory lines 408(0)-408(X).

In the case where the write data 426 includes a single memory line 408(0), the CMC 204 compresses the write data 426 using the first compression mechanism 434 to generate a first compression result 438. The first compression result 438 is then written to a compressed data area (such as the compressed data area 402(0)) corresponding to the memory write address 428.

However, if the write data 426 includes a plurality of associated memory lines 408(0), 408(1), the CMC 204 compresses separately each of the associated memory lines 408(0), 408(1) using the first compression mechanism 434 to generate the first compression result 438. The CMC 204 also compresses together the associated memory lines 408(0), 408(1) using the second compression mechanism 436 to generate the second compression result 440. In some aspects, the CMC 204 may perform both sets of compressions in parallel. The CMC 204 then determines which compression method achieved the better compression ratio by comparing a size of the second compression result 440 with a size of the first compression result 438. If the size of the second compression result 440 is smaller, the CMC 204 writes the second compression result 440 to the compressed data area 402(0). Otherwise, the first compression result 438 is written to the compressed data area 402(0) by the CMC 204.

After writing compressed data to the system memory 206, the CMC 204 may also update the master table 412 and/or the CI cache 418 with an updated CI (such as the CI 416(0)

or the CI 422(0)) for the compressed data area 402(0) corresponding to the memory write address 428. As non-limiting examples, the CIs 416(0), 422(0) may include a length of the compressed data stored in the compressed data area 402(0), a compression type (e.g., the first compression mechanism 434 or the second compression mechanism 436) of the data stored in the compressed data area 402(0), and/or an occupied memory granules indicator indicating which of the memory granules 406(0)-406(3) are used to store compressed data within the compressed data area 402(0). In some aspects, the CMC 204 may write data to one or more unoccupied memory granules 406(0)-406(3) of the compressed data area 402(0), and/or may write to one or more memory granules 406(0)-406(3) that were previously used to store data for the memory write address 428. In this manner, the CMC 204 may avoid the need to perform a read-modify-write (RMW) operation to update the memory granules 406(0)-406(3). Exemplary usage of the memory granules 406(0)-406(3) within the compressed data area 402(0) for storing and updating compressed data is discussed in greater detail below with respect to FIG. 5.

The CMC 204 in some aspects may also receive the memory read request 430 from the system cache 210 (e.g., as a result of a cache miss on the system cache 210). The memory read request 430 may include the memory read address 432 from which data is to be read. In some aspects, the memory read request 430 may also include the prefetch accuracy indicator 410 provided by the system cache 210 to indicate how successful the prefetching of memory lines 408(0)-408(X) has been historically. The CMC 204 may determine a number of memory lines 408(0)-408(X) to read from the system memory 206. Some aspects may provide that the CMC 204 may determine the number of memory lines 408(0)-408(X) to read based on the prefetch accuracy indicator 410. For example, if the prefetch accuracy indicator 410 is below a specified threshold, the CMC 204 may opt to not use extra memory bandwidth for prefetching, and thus may read data for only a single memory line 408(0)-408(X) from the system memory 206.

Based on the determined number of memory lines 408 (0)-408(X) to read, along with a CI (such as the CI 416(0)) from a master table entry 414(0) of the master table 412, the CMC 204 may read compressed data for one or more memory lines 408(0)-408(X) from the compressed data area 402(0) of the system memory 206. The CMC 204 may then decompress the compressed data, and may return the one or more memory lines 408(0)-408(X) to the system cache 210. In aspects in which the CI cache 418 is in use, the CMC 204 may consult the CI cache 418 prior to accessing the master table 412. If the CMC 204 determines that a CI cache entry 420(0)-420(C) of the CI cache 418 corresponds to the memory read address 432, the CMC 204 may read a CI (such as the CI 422(0)) from the CI cache 418, thus conserving memory bandwidth by avoiding an unnecessary read to the master table 412.

According to some aspects, the CMC 204 may also determine how many memory lines 408(0)-408(X) to read based on memory bus utilization and/or memory controller queue occupancy, as non-limiting examples. For example, the CMC 204 may reduce fetching of extra data if a memory bus is congested with traffic. The CMC 204 may further take into account a size of the compressed data stored in the compressed data area 402(0), and may elect to prefetch data only if the size of the compressed data is less than or equal to a specified threshold. Once the number of memory lines 408(0)-408(X) is determined, the CMC 204 may inform the system cache 210 how many memory lines 408(0)-408(X) will be returned by providing an indication ("IND") 442 of whether more than one memory line 408(0)-408(X) will be returned. The indication 442 in some aspects may be provided as part of a read acknowledgement message ("READ ACK") 444 sent to the system cache 210 in response to the memory read request 430.

Figure 5:
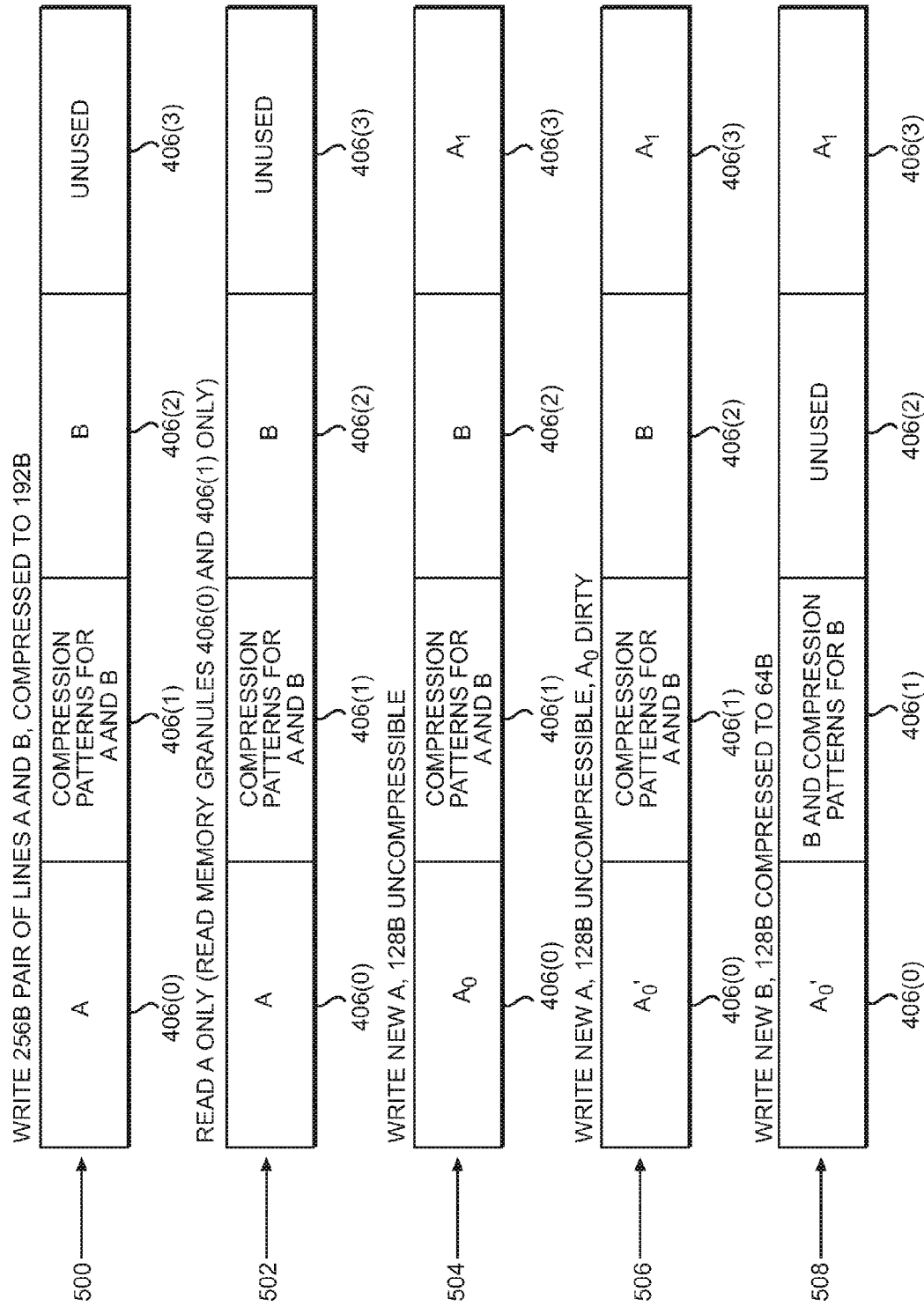
FIG. 5 is a block diagram illustrating exemplary usage of available memory granules within a compression data area for storing and updating compressed memory lines.

As noted above, the CMC 204 may be flexible in how compressed data is stored within memory granules, such as the memory granules 406(0)-406(3), of the compressed data area 402(0). To illustrate exemplary usage of the memory granules 406(0)-406(3) within the compressed data area 402(0) for storing and updating compressed data, FIG. 5 is provided. In FIG. 5, contents of the memory granules 406(0)-406(3) are illustrated as a series of memory write operations and memory read operations. It is assumed for purposes of this example that each of the memory granules 406(0)-406(3) is 64 bytes in size. The first memory write operation, indicated by arrow 500, writes data from two associated 128-byte memory lines (e.g., the memory lines 408(0), 408(1) of FIG. 4), represented by "A" and "B," into the memory granules 406(0)-406(3) of the compressed data area 402(0). In this example, the 256 bytes of A and B are compressed together by the CMC 204 into 192 bytes of data. Compressed data that is exclusive to A is stored in the memory granule 406(0), while compressed data that is exclusive to B is stored in the memory granule 406(2). A plurality of common compression patterns for both A and B, which are generated by the compression algorithm and which identify and encode frequently occurring patterns in the uncompressed data, are stored in the centrally located memory granule 406(1), while the memory granule 406(3) is unused. Because the compression patterns for A and B are stored in the centrally located memory granule 406(1), any subsequent memory read operation for A requires reading and decompressing only the contents of the memory granules 406(0) and 406(1), as indicated by arrow 502. Likewise, a later memory read operation for B requires reading only the contents of the memory granules 406(1) and 406(2). Note that in some aspects, the compressed data that is exclusive to A and the compressed data that is exclusive to B may overflow into the memory granule 406(1) if either or both are too large to fit within the memory granule 406(0) and/or the memory granule 406(2), respectively.

Continuing at arrow 504 in FIG. 5, new data is written for A. The new data is uncompressible, and thus requires 128 bytes of storage space. In some aspects, the CMC 204 is configured to recycle the memory granule 406(0) to store 64 bytes of the uncompressed data ("A$_0$'"), with the remaining 64 bytes of data ("A$_1$'") being stored in the previously unused memory granule 406(3). The memory granules 406(1) and 406(2) are undisturbed, leaving the compressed data for B intact and accessible by the CMC 204. At arrow 506, additional new data is written for A. While this additional new data is also uncompressible, the top 64 bytes of data for A is unchanged. Accordingly, the CMC 204 may be configured to overwrite only the memory granule 406(0) in which modified data ("A$_0$'") is stored. After each instance of new data being written to A, the CIs 416(0)-416(D) that correspond to A in the master table 412 (and, in some aspects, the CIs 422(0)-422(V) that correspond to A in the CI cache 418) are updated to reflect the compression status and the storage locations for the compressed data for A. The compressed data for B in the memory granules 406(1) and 406(2) remains unchanged.

Finally, at arrow 508, new data is written for B. In this example, the 128 bytes of new data for B is compressed by the CMC 204 into 64 bytes of compressed data. The CMC 204 thus stores the new data for B (both the compressed data and the corresponding compression pattern data) in the memory granule 406(1). The memory granule 406(2) is no longer needed to store data for B, and is marked as unused by the CMC 204. The previously stored data for A in the memory granules 406(0) and 406(3) remains intact and accessible by the CMC 204.

Figure 6A:
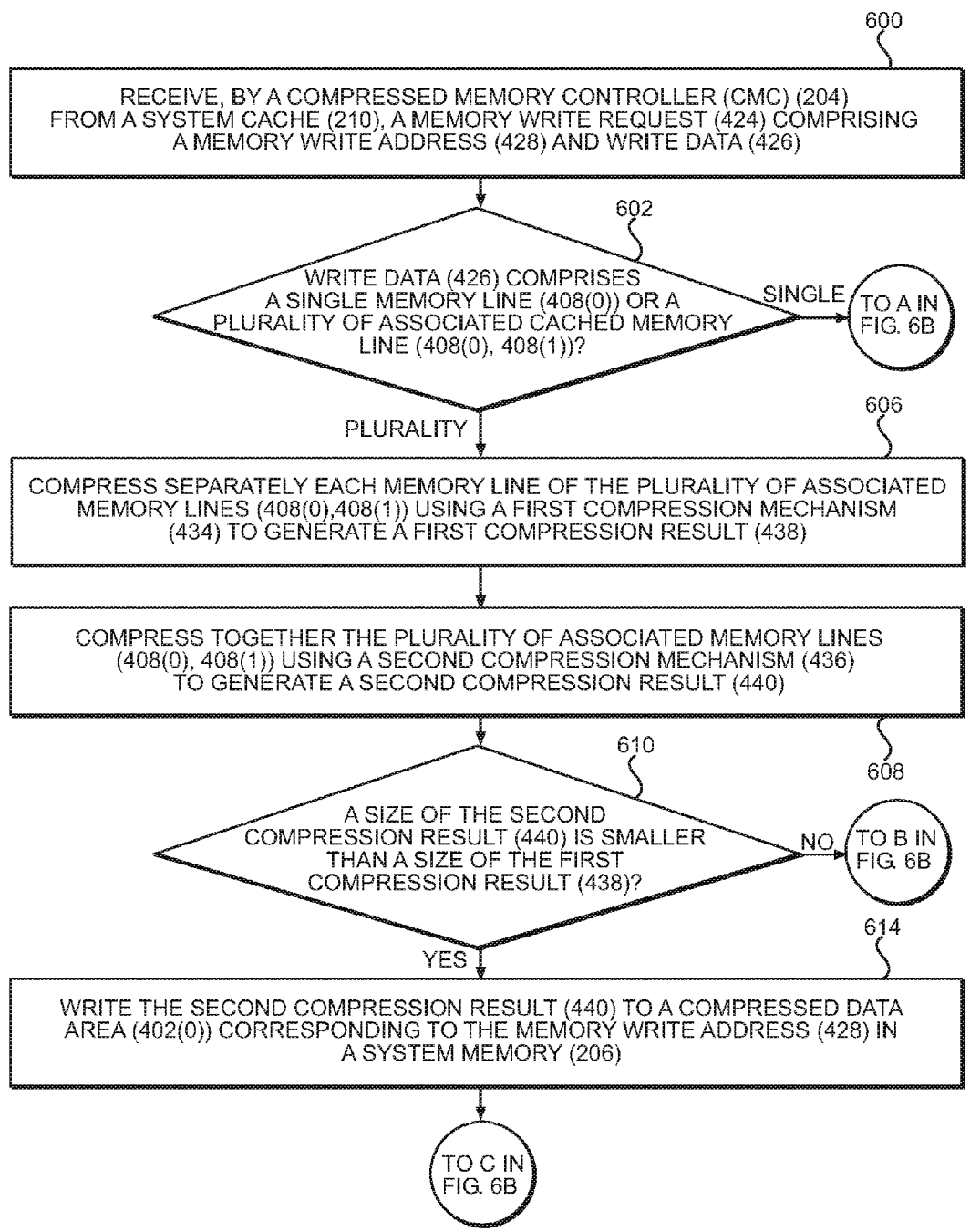
FIGS. 6A and 6B are flowcharts illustrating exemplary operations for performing a memory write operation by the CMC and the system cache of FIG. 2 using adaptive memory bandwidth compression.
Figure 6B:
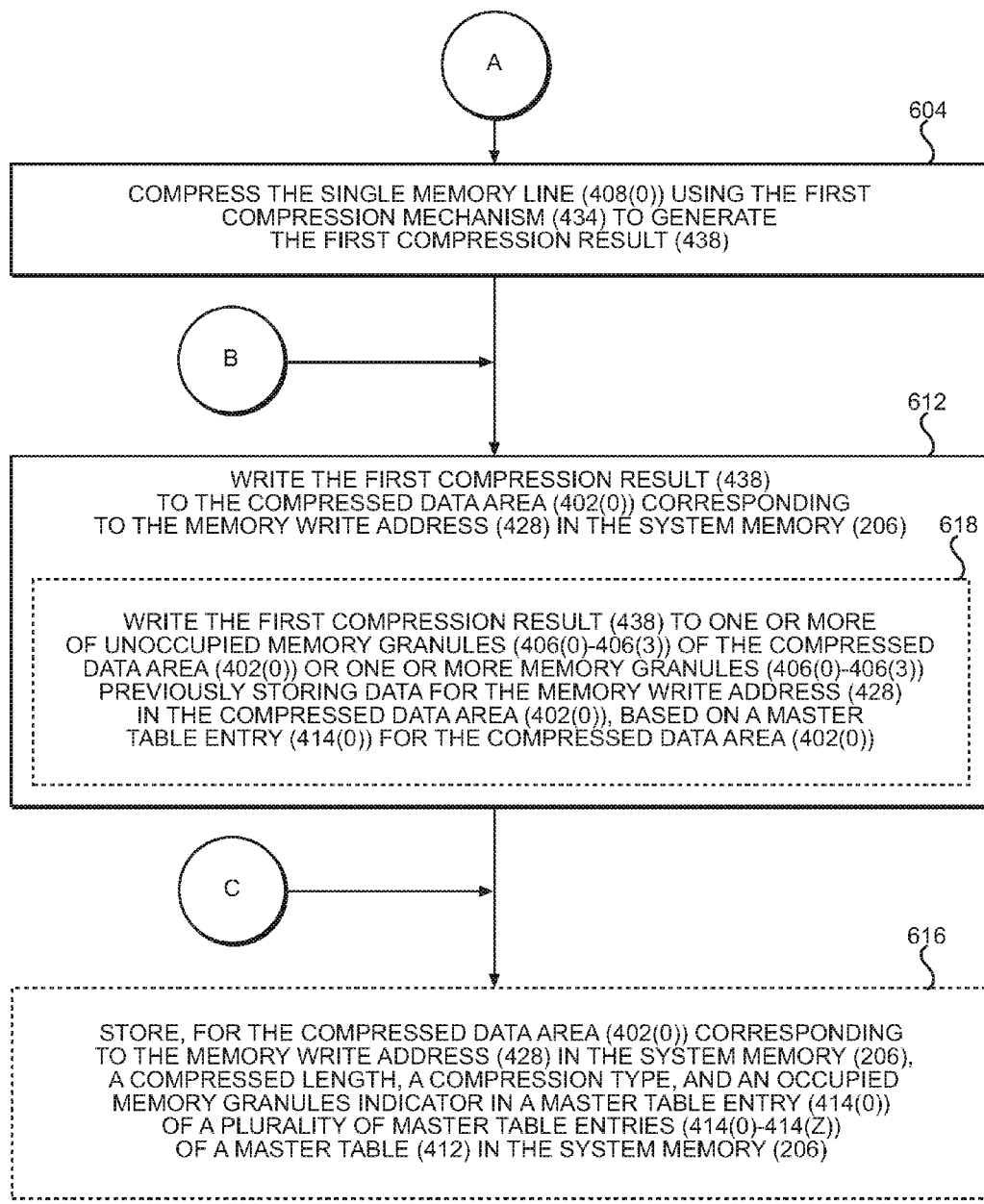

To illustrate exemplary operations for performing a memory write operation by the CMC 204 and the system cache 210 of FIGS. 2-4 using adaptive memory bandwidth compression, FIGS. 6A and 6B are provided. Elements of FIGS. 1-5 are referenced in describing FIGS. 6A and 6B for the sake of clarity. In FIG. 6A, operations begin with the CMC 204 receiving, from the system cache 210, the memory write request 424 including the memory write address 428 and the write data 426 (block 600). Accordingly, the CMC 204 may be referred to herein as "a means for receiving a memory write request comprising a memory write address and write data." In some aspects, the CMC 204 next determines whether the write data 426 includes a single cached memory line 408(0) or a plurality of associated cached memory lines 408(0), 408(1) (block 602). If the CMC 204 determines at decision block 602 that the write data 426 includes a single cached memory line 408(0), processing resumes at block 604 of FIG. 6B.

However, if the write data 426 is determined at decision block 602 to include a plurality of associated cached memory lines 408(0), 408(1), the CMC 204 performs adaptive memory bandwidth compression by first compressing each cached memory line of the plurality of associated cached memory lines 408(0), 408(1) separately using a first compression mechanism 434 to generate a first compression result 438 (block 606). The CMC 204 thus may be referred to herein as "a means for compressing separately each memory line of a plurality of associated memory lines of the write data using a first compression mechanism to generate a first compression result." As a non-limiting example, the first compression mechanism 434 may include applying a compression algorithm optimized for relatively smaller data sizes to each of the associated cached memory lines 408(0), 408(1). The CMC 204 also compresses the plurality of associated cached memory lines 408(0), 408(1) together using a second compression mechanism 436 to generate a second compression result 440 (block 608). Accordingly, the CMC 204 may be referred to herein as "a means for compressing together the plurality of associated memory lines using a second compression mechanism to generate a second compression result." In some aspects, the second compression mechanism 436 may include applying a compression algorithm that is better suited to compressing relatively larger data sizes to the associated cached memory lines 408(0), 408(1). Some aspects may provide that the CMC 204 is configured to generate the second compression result 440 in parallel with generating the first compression result 438.

The CMC 204 then determines whether a size of the second compression result 440 is smaller than a size of the first compression result 438 (block 610). In this regard, the CMC 204 may be referred to herein as "a means for determining whether a size of the second compression result is smaller than a size of the first compression result." If not (i.e., if compressing the associated cached memory lines 408(0), 408(1) together does not result in a smaller compressed size than compressing the associated cached memory lines 408(0), 408(1) separately), processing resumes at block 612 of FIG. 6B. If the CMC 204 determines at decision block 610 that the size of the second compression result 440 is smaller than the size of the first compression result 438, the CMC 204 writes the second compression result 440 to the compressed data area 402(0) corresponding to the memory write address 428 in the system memory 206 (block 614). The CMC 204 thus may be referred to herein as "a means for writing the second compression result to a compressed data area corresponding to the memory write address in a system memory, responsive to determining that a size of the second compression result is smaller than a size of the first compression result." Processing then resumes at block 616 of FIG. 6B.

Referring now to FIG. 6B, if the CMC 204 determines at decision block 602 of FIG. 6A that the write data 426 includes a single cached memory line 408(0) rather than a plurality of associated cached memory lines 408(0), 408(1), the CMC 204 compresses the single cached memory line 408(0) using the first compression mechanism 434 to generate the first compression result 438 (block 604). The CMC 204 then writes the first compression result 438 to the compressed data area 402(0) corresponding to the memory write address 428 in the system memory 206 (block 612). In some aspects, operations of block 612 for writing the first compression result 438 to the compressed data area 402(0) may include the CMC 204 writing the first compression result 438 to one or more of unoccupied memory granules 406(0)-406(3) of the compressed data area 402(0) or one or more memory granules 406(0)-406(3) previously storing data for the memory write address 428 in the compressed data area 402(0), based on a master table entry 414(0) for the compressed data area 402(0) (block 618). Some aspects may also provide that the CMC 204 then stores, for the compressed data area 402(0) corresponding to the memory write address 428 in the system memory 206, a compressed length, a compression type, and an occupied memory granules indicator in the master table entry 414(0) of the plurality of master table entries 414(0)-414(Z) of the master table 412 in the system memory 206 (block 616).

Figure 7A:
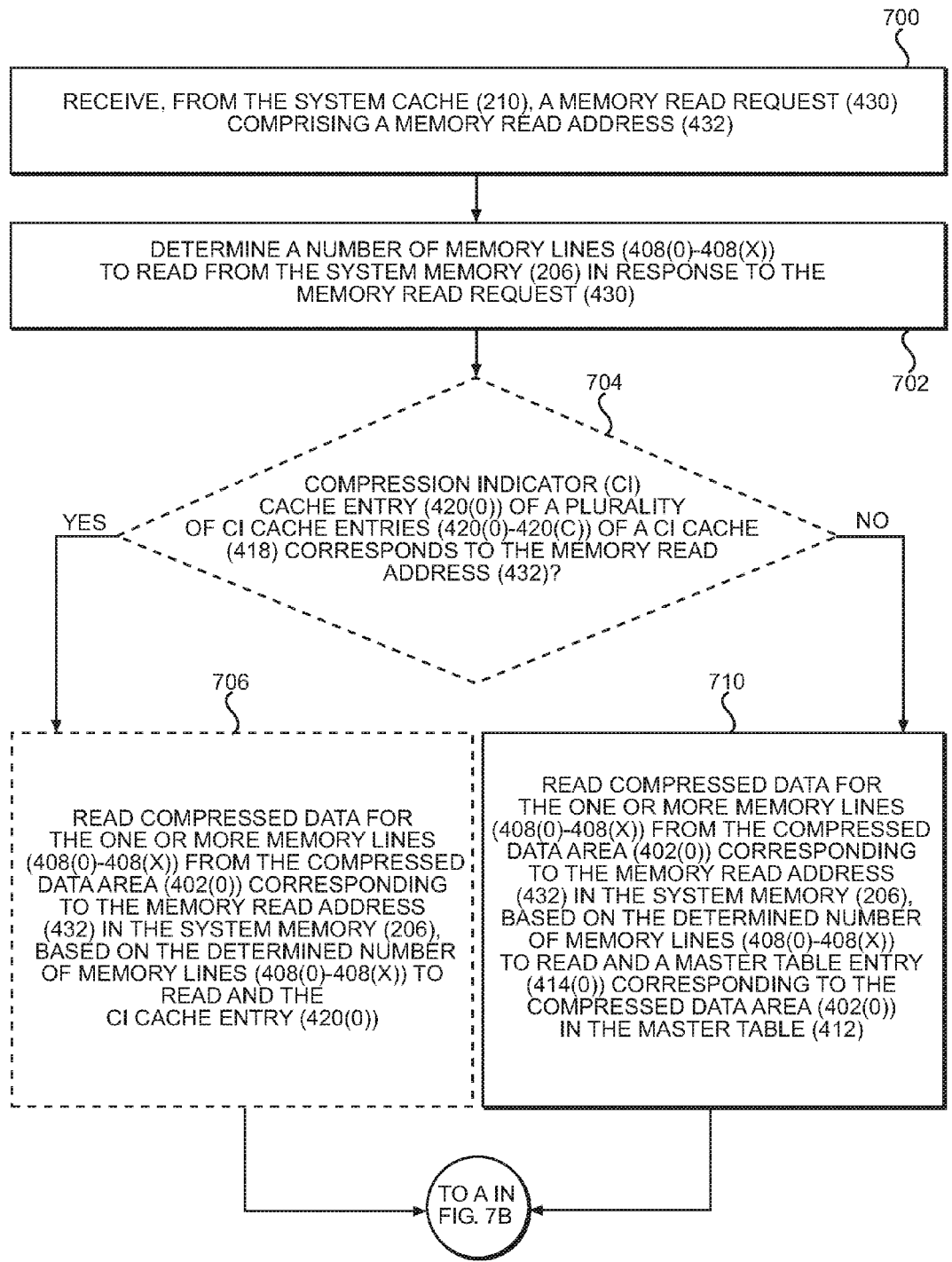
FIGS. 7A and 7B are flowcharts illustrating exemplary operations for performing a memory read operation by the CMC and the system cache of FIG. 2 using adaptive memory bandwidth compression.
Figure 7B:
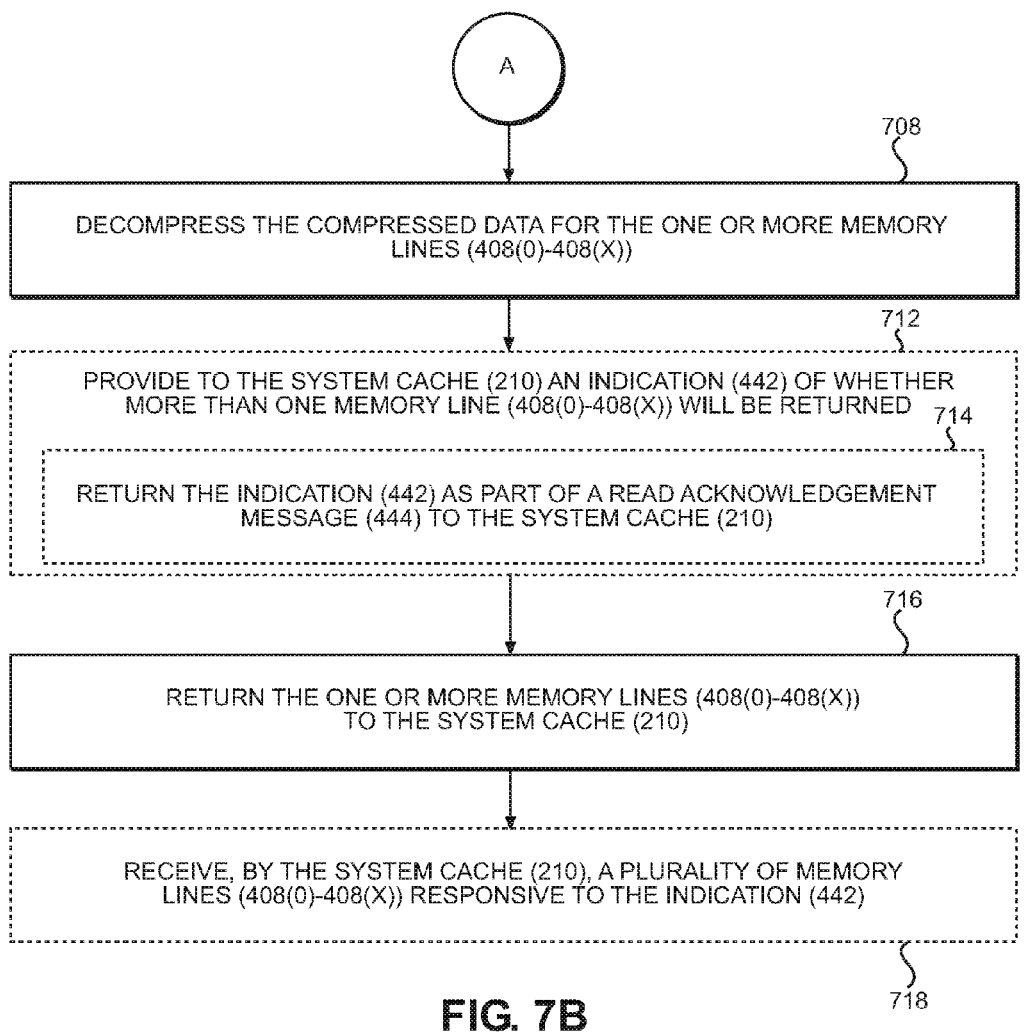

FIGS. 7A and 7B illustrate exemplary operations for performing a memory read operation by the CMC 204 and the system cache 210 of FIGS. 2-4 using adaptive memory bandwidth compression. For the sake of clarity, elements of FIGS. 2-4 are referenced in describing FIGS. 7A and 7B. Operations in FIG. 7A begin with the CMC 204 receiving, from the system cache 210, a memory read request 430 comprising a memory read address 432 (block 700). The CMC 204 determines a number of memory lines 408(0)-408(X) to read from the system memory 206 in response to the memory read request 430 (block 702). As non-limiting examples, the CMC 204 may make the determination regarding how many memory lines 408(0)-408(X) to read from the system memory 206 based on memory bus utilization and/or on a size of compressed data stored in the compressed data area 402(0) corresponding to the memory read address 432 in the system memory 206. Some aspects may provide that the CMC 204 may determine how many memory lines 408(0)-408(X) to read from the system memory 206 based on a prefetch accuracy indicator 410 provided by the system cache 210 as part of the memory read request 430.

In aspects in which a CI cache 418 is in use, the CMC 204 may next determine whether a CI cache entry 420(0) of the plurality of CI cache entries 420(0)-420(C) of the CI cache 418 corresponds to the memory read address 432 (block 704). If so, the CMC 204 reads compressed data for the one or more memory lines 408(0)-408(X) from the compressed data area 402(0) corresponding to the memory read address 432 in the system memory 206, based on the determined number of memory lines 408(0)-408(X) to read and the CI cache entry 420(0) (block 706). Processing then resumes at block 708 of FIG. 7B. If a CI cache 418 is not in use, or if the CMC 204 determines at decision block 704 that none of the plurality of CI cache entries 420(0)-420(C) of the CI cache 418 corresponds to the memory read address 432, the CMC 204 reads compressed data for the one or more memory lines 408(0)-408(X) from the compressed data area 402(0) corresponding to the memory read address 432 in the system memory 206, based on the determined number of memory lines 408(0)-408(X) to read and the master table entry 414(0) corresponding to the compressed data area 402(0) in the master table 412 (block 710). Processing resumes at block 708 of FIG. 7B.

Referring now to FIG. 7B, the CMC 204 next decompresses the compressed data for the one or more memory lines 408(0)-408(X) (block 708). In some aspects, the CMC 204 may provide to the system cache 210 an indication 442 of whether more than one memory line 408(0)-408(X) will be returned (block 712). This indication 442 may be provided in some aspects as part of a read acknowledgement message 444 to the system cache 210, as a non-limiting example (block 714). In some aspects, operations of block 708 for decompressing the compressed data for the one or more memory lines 408(0)-408(X) may vary depending on how many memory lines 408(0)-408(X) were read, how many memory granules 406(0)-406(3) store compressed data, and/or on whether the first compression mechanism 434 or the second compression mechanism 436 was used to compress the compressed data. As non-limiting examples, the one or more memory lines 408(0)-408(X) may have been compressed together using the second compression mechanism 436 into two (2) or four (4) of the memory granules 406(0)-406(3), may have been compressed together using the first compression mechanism 434 into two (2) of the memory granules 406(0)-406(3), or may have been compressed separately using either the first compression mechanism 434 or the second compression mechanism 436. The CMC 204 thus may use the master table entry 414(0) (or the CI cache entry 420(0)) to determine the appropriate decompression mechanism to employ, and to determine how much compressed data to decompress. Because the compressed data may be located at any position within the compressed data area 402(0), the CMC 204 may also use the master table entry 414(0) (or the CI cache entry 420(0)) to determine the memory granules 406(0)-406(3) from which to read compressed data. The CMC 204 then returns the one or more memory lines 408(0)-408(X) to the system cache 210 (block 716). According to some aspects, the system cache 210 is configured to receive a plurality of memory lines 408(0)-408(X) responsive to the indication 442 (block 718).

Providing memory bandwidth compression using adaptive compression in CPU-based systems according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 8:
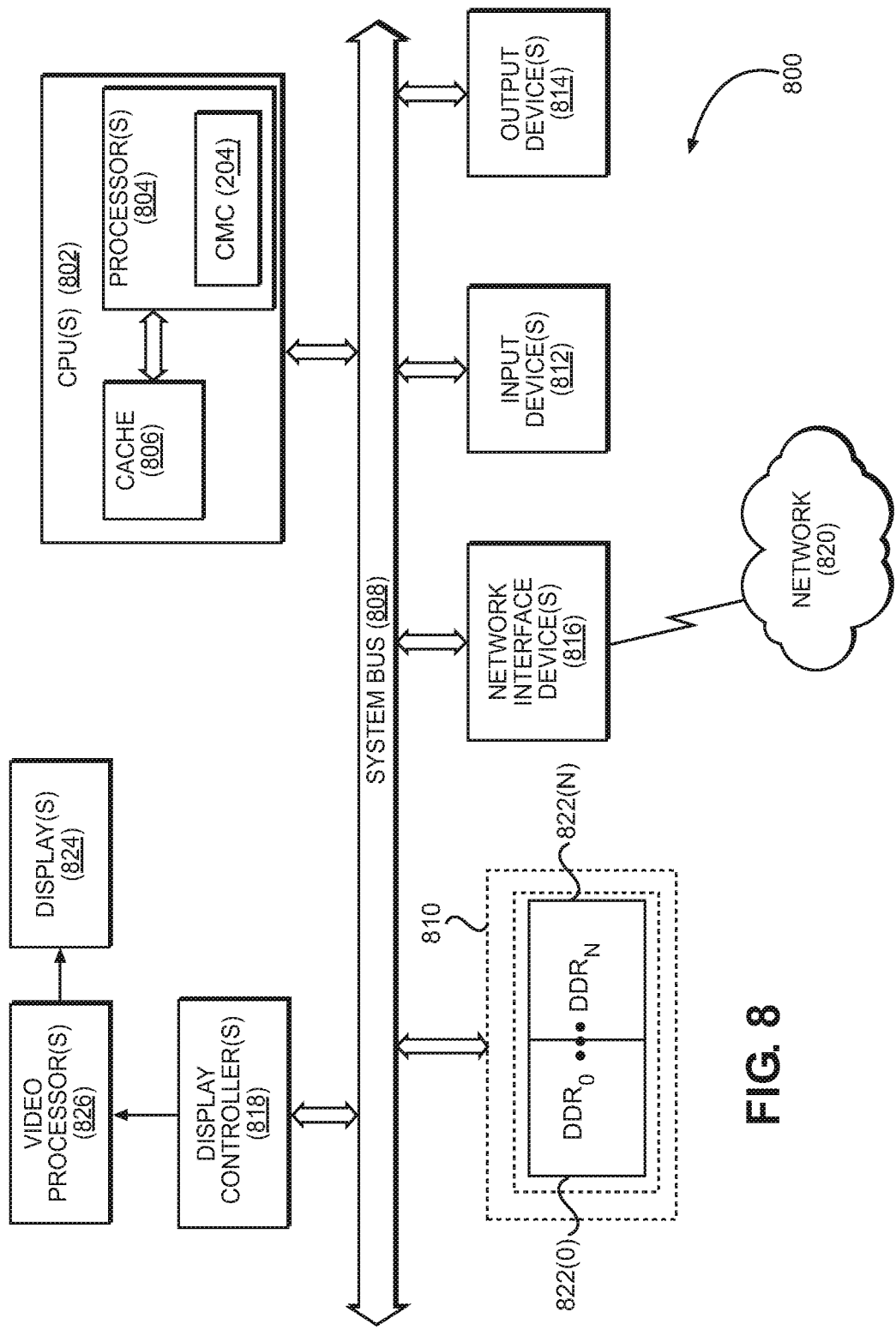
FIG. 8 is a block diagram of an exemplary processor-based system that may include the SoC of FIG. 2 that employs the CMC and the system cache of FIG. 2.

In this regard, FIG. 8 illustrates an example of a processor-based system 800 that can employ the SoC 200 with the CMC 204 of FIG. 2. In this example, the processor-based system 800 includes one or more CPUs 802, each including one or more processors 804. The CPU(s) 802 may have cache memory 806 coupled to the processor(s) 804 for rapid access to temporarily stored data. The CPU(s) 802 is coupled to a system bus 808 and can intercouple devices included in the processor-based system 800. As is well known, the CPU(s) 802 communicates with these other devices by exchanging address, control, and data information over the system bus 808. For example, the CPU(s) 802 can communicate bus transaction requests to the CMC 204 as an example of a slave device. Although not illustrated in FIG. 8, multiple system buses 808 could be provided.

Other devices can be connected to the system bus 808. As illustrated in FIG. 8, these devices can include a memory system 810, one or more input devices 812, one or more output devices 814, one or more network interface devices 816, and one or more display controllers 818, as examples. The input device(s) 812 can include any type of input device, including but not limited to input keys, switches, voice processors, etc. The output device(s) 814 can include any type of output device, including but not limited to audio, video, other visual indicators, etc. The network interface device(s) 816 can be any devices configured to allow exchange of data to and from a network 820. The network 820 can be any type of network, including but not limited to a wired or wireless network, a private or public network, a local area network (LAN), a wide local area network, wireless local area network, BLUETOOTH (BT), and the Internet. The network interface device(s) 816 can be configured to support any type of communications protocol desired. The memory system 810 can include one or more memory units 822(0)-822(N).

The CPU(s) 802 may also be configured to access the display controller(s) 818 over the system bus 808 to control information sent to one or more displays 824. The display controller(s) 818 sends information to the display(s) 824 to be displayed via one or more video processors 826, which process the information to be displayed into a format suitable for the display(s) 824. The display(s) 824 can include any type of display, including but not limited to a cathode ray tube (CRT), a liquid crystal display (LCD), a light emitting diode (LED) display, a plasma display, etc.

The devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, controllers, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A memory bandwidth compression system of a central processing unit (CPU)-based system, comprising a compressed memory controller (CMC) configured to access a system memory and communicatively coupled to a system cache via a system bus;
the CMC further configured to:
    receive, from the system cache, a memory write request comprising a memory write address and write data;
    compress separately and independently each memory line of a plurality of associated memory lines of the write data using a first compression mechanism to generate a first compression result;
    compress together the plurality of associated memory lines using a second compression mechanism to generate a second compression result;
    determine whether a size of the second compression result is smaller than a size of the first compression result;
    responsive to determining that a size of the second compression result is smaller than a size of the first compression result, write the second compression result to a compressed data area corresponding to the memory write address in the system memory; and
    responsive to determining that a size of the second compression result is not smaller than a size of the first compression result, write the first compression result to the compressed data area corresponding to the memory write address in the system memory.

2. The memory bandwidth compression system of claim 1, further configured to:
    after receiving the memory write request comprising the memory write address and the write data:
        determine whether the write data comprises a single memory line or the plurality of associated memory lines; and
        responsive to determining that the write data comprises a single memory line:
            compress the single memory line using the first compression mechanism to generate the first compression result; and
            write the first compression result to the compressed data area corresponding to the memory write address in the system memory;
    the memory bandwidth compression system configured to compress separately and independently each memory line of the plurality of associated memory lines of the write data using the first compression mechanism to generate the first compression result and compress together the plurality of associated memory lines using the second compression mechanism to generate the second compression result responsive to determining that the write data comprises the plurality of associated memory lines.

3. The memory bandwidth compression system of claim 2, wherein:
    the system cache is configured to provide the write data comprising:
        the plurality of associated memory lines; and
        a plurality of dirty bits each indicating whether data stored in a corresponding memory line of the plurality of associated memory lines has been modified; and
    the CMC is configured to determine whether the write data comprises a single memory line or a plurality of associated memory lines based on the plurality of dirty bits.

4. The memory bandwidth compression system of claim 2, wherein the CMC is further configured to store, for the compressed data area corresponding to the memory write address in the system memory, a compressed length, a compression type, and an occupied memory granules indicator in a master table entry of a plurality of master table entries of a master table in the system memory.

5. The memory bandwidth compression system of claim 4, wherein the CMC is configured to write the first compression result to the compressed data area corresponding to the memory write address in the system memory by writing the first compression result to one or more of unoccupied memory granules of the compressed data area or one or more memory granules previously storing data for the memory write address in the compressed data area, based on the master table entry for the compressed data area.

6. The memory bandwidth compression system of claim 4, wherein the CMC is further configured to write a plurality of common compression patterns for the plurality of associated memory lines into a centrally located memory granule in the compressed data area.

7. The memory bandwidth compression system of claim 4, wherein the CMC is further configured to:

receive, from the system cache, a memory read request comprising a memory read address;

determine a number of memory lines to read from the system memory in response to the memory read request;

read compressed data for one or more memory lines from a compressed data area corresponding to the memory read address in the system memory, based on the determined number of memory lines to read and a master table entry corresponding to the compressed data area in the master table;

decompress the compressed data into the one or more memory lines; and return the one or more memory lines to the system cache.

8. The memory bandwidth compression system of claim 7, wherein the CMC is configured to determine the number of memory lines to read based on memory bus utilization.

9. The memory bandwidth compression system of claim 7, wherein the CMC is configured to determine the number of memory lines to read based on a size of the compressed data stored in the compressed data area corresponding to the memory read address in the system memory.

10. The memory bandwidth compression system of claim 7, wherein:

the system cache is configured to provide the memory read request further comprising a prefetch accuracy indicator; and the CMC is configured to determine the number of memory lines to read based on the prefetch accuracy indicator.

11. The memory bandwidth compression system of claim 10, wherein the system cache is configured to:

maintain a count of prefetched lines received from the CMC that were subsequently accessed;

maintain a count of total prefetched lines received from the CMC; and generate the prefetch accuracy indicator based on a ratio of the count of prefetched lines received that were subsequently accessed and the count of total prefetched lines received.

12. The memory bandwidth compression system of claim 7, wherein:

the CMC further comprises a compression indicator (CI) cache comprising a plurality of CI cache entries corresponding to one or more previously accessed master table entries of the plurality of master table entries of the master table;

the CMC is further configured to, prior to reading the compressed data for the one or more memory lines from the compressed data area:

determine whether a CI cache entry of the plurality of CI cache entries corresponds to the memory read address; and responsive to determining that a CI cache entry of the plurality of CI cache entries corresponds to the memory read address, read the compressed data for the one or more memory lines from the compressed data area corresponding to the memory read address in the system memory, based on the CI cache entry; and the CMC is configured to read the compressed data for the one or more memory lines from the compressed data area corresponding to the memory read address in the system memory responsive to determining that no CI cache entry of the plurality of CI cache entries corresponds to the memory read address.

13. The memory bandwidth compression system of claim 7, wherein the CMC is further configured to, prior to returning the one or more memory lines to the system cache, provide to the system cache an indication of whether more than one memory line will be returned.

14. The memory bandwidth compression system of claim 13, wherein the CMC is configured to provide to the system cache the indication of whether more than one memory line will be returned as part of a read acknowledgement message to the system cache.

15. The memory bandwidth compression system of claim 13, wherein the system cache is further configured to receive a plurality of memory lines responsive to the indication provided by the CMC.

16. The memory bandwidth compression system of claim 1 integrated into an integrated circuit (IC).

17. The memory bandwidth compression system of claim 1 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device (e.g., a smart watch, a health or fitness tracker, eyewear, etc.); a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

18. A memory bandwidth compression system of a central processing unit (CPU)-based system, comprising:

a means for receiving a memory write request comprising a memory write address and write data;

a means for compressing separately and independently each memory line of a plurality of associated memory lines of the write data using a first compression mechanism to generate a first compression result;

a means for compressing together the plurality of associated memory lines using a second compression mechanism to generate a second compression result;

a means for determining whether a size of the second compression result is smaller than a size of the first compression result;

a means for writing the second compression result to a compressed data area corresponding to the memory write address in a system memory, responsive to determining that a size of the second compression result is smaller than a size of the first compression result; and a means for writing the first compression result to the compressed data area corresponding to the memory write address in the system memory, responsive to determining that a size of the second compression result is not smaller than a size of the first compression result.

19. A method for providing adaptive memory bandwidth compression, comprising:

receiving, by a compressed memory controller (CMC) from a system cache, a memory write request comprising a memory write address and write data;

compressing separately and independently each memory line of a plurality of associated memory lines of the write data using a first compression mechanism to generate a first compression result;

compressing together the plurality of associated memory lines using a second compression mechanism to generate a second compression result;
determining whether a size of the second compression result is smaller than a size of the first compression result;
responsive to determining that a size of the second compression result is smaller than a size of the first compression result, writing the second compression result to a compressed data area corresponding to the memory write address in a system memory; and
responsive to determining that a size of the second compression result is not smaller than a size of the first compression result, writing the first compression result to the compressed data area corresponding to the memory write address in the system memory.

20. The method of claim 19, further comprising, after receiving the memory write request comprising the memory write address and the write data:
determining whether the write data comprises a single memory line or the plurality of associated memory lines; and responsive to determining that the write data comprises a single memory line:
compressing the single memory line using the first compression mechanism to generate the first compression result; and
writing the first compression result to the compressed data area corresponding to the memory write address in the system memory;
wherein compressing separately and independently each memory line of the plurality of associated memory lines using the first compression mechanism to generate the first compression result and compressing together the plurality of associated memory lines using the second compression mechanism to generate the second compression result is responsive to determining that the write data comprises the plurality of associated memory lines.

21. The method of claim 20, wherein determining whether the write data comprises a single memory line or a plurality of associated memory lines is based on a plurality of dirty bits provided with the write data, each dirty bit indicating whether data stored in a corresponding memory line of the plurality of associated memory lines has been modified.

22. The method of claim 20, further comprising storing, for the compressed data area corresponding to the memory write address in the system memory, a compressed length, a compression type, and an occupied memory granules indicator in a master table entry of a plurality of master table entries of a master table in the system memory.

23. The method of claim 22, wherein writing the first compression result to the compressed data area corresponding to the memory write address in the system memory comprises writing the first compression result to one or more of unoccupied memory granules of the compressed data area or one or more memory granules previously storing data for the memory write address in the compressed data area, based on the master table entry for the compressed data area.

24. The method of claim 22, further comprising writing a plurality of common compression patterns for the plurality of associated memory lines into a centrally located memory granule in the compressed data area.

25. The method of claim 22, further comprising:
receiving, from the system cache, a memory read request comprising a memory read address;
determining a number of memory lines to read from the system memory in response to the memory read request;
reading compressed data for one or more memory lines from a compressed data area corresponding to the memory read address in the system memory, based on the determined number of memory lines to read and a master table entry corresponding to the compressed data area in the master table;
decompressing the compressed data into the one or more memory lines; and
returning the one or more memory lines to the system cache.

26. The method of claim 25, wherein determining the number of memory lines to read is based on memory bus utilization.

27. The method of claim 25, wherein determining the number of memory lines to read is based on a size of the compressed data stored in the compressed data area corresponding to the memory read address in the system memory.

28. The method of claim 25, wherein determining the number of memory lines to read is based on a prefetch accuracy indicator provided by the memory read request.

29. The method of claim 28, wherein the prefetch accuracy indicator is generated by the system cache based on a ratio of a count of prefetched lines received that were subsequently accessed and a count of total prefetched lines received.

30. The method of claim 25, further comprising, prior to reading the compressed data for the one or more memory lines from the compressed data area:
determining whether a compression indicator (CI) cache entry of a plurality of CI cache entries of a CI cache corresponds to the memory read address; and
responsive to determining that a CI cache entry of the plurality of CI cache entries corresponds to the memory read address, reading the compressed data for the one or more memory lines from the compressed data area corresponding to the memory read address in the system memory, based on the determined number of memory lines to read and the CI cache entry;
wherein reading the compressed data for the one or more memory lines from the compressed data area corresponding to the memory read address in the system memory based on the determined number of memory lines to read and the master table entry corresponding to the compressed data area in the master table is responsive to determining that no CI cache entry of the plurality of CI cache entries corresponds to the memory read address.

31. The method of claim 25, further comprising, prior to returning the one or more memory lines to the system cache, providing to the system cache an indication of whether more than one memory line will be returned.

32. The method of claim 31, wherein providing to the system cache the indication of whether more than one memory line will be returned comprises returning the indication as part of a read acknowledgement message to the system cache.

33. The method of claim 31, further comprising receiving, by the system cache, a plurality of memory lines responsive to the indication.

* * * * *